(12) United States Patent
Kim

(10) Patent No.: US 7,372,639 B2
(45) Date of Patent: May 13, 2008

(54) SUBMINIATURE OPTICAL SYSTEM

(75) Inventor: Tae Young Kim, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/603,014

(22) Filed: Nov. 22, 2006

(65) Prior Publication Data

US 2007/0121221 A1 May 31, 2007

(30) Foreign Application Priority Data

Nov. 25, 2005 (KR) .................. 10-2005-0113633

(51) Int. Cl.
 *G02B 13/18* (2006.01)
 *G02B 9/06* (2006.01)
(52) U.S. Cl. ....................... 359/717; 359/794
(58) Field of Classification Search ............... 359/717, 359/718, 793, 794

See application file for complete search history.

(56) References Cited

U.S. PATENT DOCUMENTS 5,739,965 A * 4/1998 Ohno ..................... 359/753

FOREIGN PATENT DOCUMENTS

| EP | 1 416 306 | 5/2004 |
|----|-----------|--------|
| EP | 1 441 248 | 7/2004 |
| EP | 1 555 559 | 7/2005 |
| EP | 1 650 592 | 4/2006 |
| JP | 2004-199092 | 7/2004 |

OTHER PUBLICATIONS

Extended European Search Report, mailed Mar. 9, 2007 and issued in corresponding European Patent Application No. 06256038.8-2217.

* cited by examiner

*Primary Examiner*—Scott J. Sugarman

(57) ABSTRACT

A subminiature imaging optical system with two lenses is provided. The optical system includes an aperture stop. A first meniscus lens has a positive refractive power, and includes aspherical surfaces at both of object and image sides. The object side of the first meniscus lens is convex. A second meniscus lens has a positive refractive power, and includes aspherical surfaces at both of the object and image sides. The image side of the second meniscus lens is convex. In addition, the first lens has a gap from the second lens according to following relation 1:

$0.1 < D/TL < 0.2$ relation 1, where D is the gap between the first and second lenses and TL is a distance from the aperture stop to an image plane. The invention ensures a high-definition subminiature imaging optical system improved in various aberrations and superior in MTF properties.

7 Claims, 9 Drawing Sheets

SUBMINIATURE OPTICAL SYSTEM

CLAIM OF PRIORITY

This application claims the benefit of Korean Patent Application No. 2005-113633 filed on Nov. 25, 2005 in the Korean Intellectual Property Office, the disclosure of which is incorporated herein by reference.

BACKGROUND OF THE INVENTION

1. Field of the Invention

The present invention relates to an imaging optical system, and more particularly, to a subminiature high-definition imaging optical system which adopts two meniscus lenses with a positive refractive power.

2. Description of the Related Art

In general, mobile phones featured only a communicative function at an incipient stage. However, with their use broadened, various services such as photographing or image transmission or communication have been in demand, accordingly evolving the function and services thereof. Recently, the spotlight has been given to a new concept of mobile phones, so-called, camera phones or camera mobile phones integrating digital camera technology with mobile phone technology. Moreover, under development have been so-called camcorder mobile phones or camcorder phones which incorporate digital camcorder technology into mobile phone technology to store and transmit video multimedia running for at least ten minutes. Lately, cameras installed in the mobile phones are required to possess capability of electronic still cameras. Also, photographing lenses face a fierce demand for smaller size, lighter weight and lower cost. Charge-coupled Devices (CCDs) or Complimentary Metal Oxide Semiconductors (CMOSs) in current use are increasingly reduced in their sizes so that the imaging optical system using this imaging device needs to demonstrate high-definition.

Furthermore, the photographing lenses installed in the mobile phones should be less numbered to achieve miniaturization and low cost, which however accompanies limited flexibility in design and unsatisfactory optical capability.

Therefore, there is a strong demand for a subminiature imaging optical system which is high-definite, light-weight, more cost-efficient and easily manufacturable. Also, the subminiature imaging optical system needs to correct various aberrations such as distortion and sufficiently ensures a peripheral brightness ratio.

SUMMARY OF THE INVENTION

The present invention has been made to solve the foregoing problems of the prior art and it is therefore an object according to certain embodiments of the present invention is to provide a subminiature optical system short in its total length, in which two meniscus lenses having a positive refractive power are used to achieve high definition and compactness due to fewer number of constituent lenses.

Another object according to certain embodiments of the invention is to provide a subminiature optical system which is superior in various aberration characteristics such as distortion, spherical aberration, and astigmatic aberration to sufficiently obtain a peripheral brightness ratio.

Further another object according to certain embodiments of the invention is to provide a subminiature optical system which is light weight, easily manufacturable, mass-producible and reduced in manufacturing costs.

According to an aspect of the invention for realizing the object, there is provided a subminiature imaging optical system including: an aperture stop; a first meniscus lens having a positive refractive power, and including aspherical surfaces at both of object and image sides, the object side being convex, and a second meniscus lens having a positive refractive power, and including aspherical surfaces at both of the object and image sides, the image side being convex.

The first lens has a gap from the second lens according to following relation 1:

$$0.1 < D/TL < 0.2 \qquad \text{relation 1,}$$

where D is the gap between the first and second lenses and TL is a distance from the aperture stop to an image plane.

Preferably, the second lens has a configuration according to following relation 2:

$$1.0 < R2o/R2i < 10 \qquad \text{relation 2,}$$

where $R2o$ is a curvature radius of the second lens at the object side, and $R2i$ is a curvature radius of the second lens at the image side.

Also, preferably, the first and second lenses have a refractive power according to following relation 3:

$$0 < f1/f2 < 0.25 \qquad \text{relation 3,}$$

wherein $f1$ is a focal distance of the first lens and $f2$ is a focal distance of the second lens.

More preferably, the first lens has a configuration according to following relation 4:

$$0.25 < R1o/efl < 0.5 \qquad \text{relation 4,}$$

wherein $R1o$ is a curvature radius of the first lens at the object side, and efl is an effective focal distance of an entire optical system.

Meanwhile, preferably, the first and second lenses are made of plastics.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
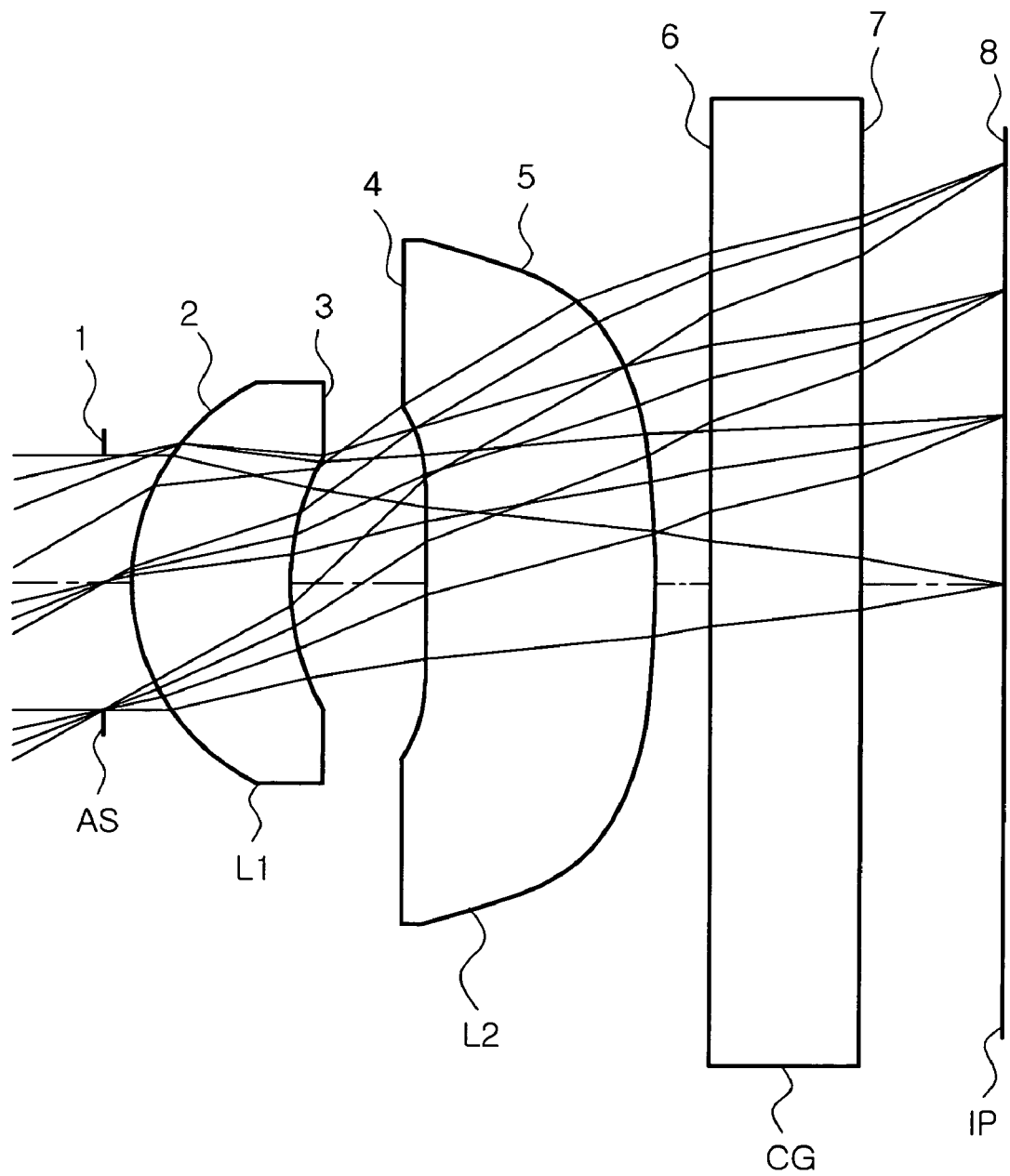
FIG. 1 is a lens configuration diagram illustrating a subminiature imaging optical system according to a first embodiment of the invention.

FIG. 1 is a lens configuration diagram illustrating a subminiature optical system according to a first embodiment of the invention. In the following drawings, the thickness, size and shape of the lens are exaggerated for clarity, and particularly, the shape of a spherical or aspherical surface is illustrative of, but not limitative of the invention.

As shown in FIG. 1, the subminiature imaging optical system of the invention includes a first meniscus lens L1, a second meniscus lens L2 and an aperture stop AS. The first meniscus lens L1 has a positive refractive power, and includes aspherical surfaces at both of object and image sides. Here the object side of the first meniscus lens L1 is convex. Meanwhile, the second meniscus lens L2 has a positive refractive power, and includes aspherical surfaces at both of the object and image sides. Here the image side of the second meniscus lens L2 is convex. The aperture stop AS is disposed in the closest proximity to the object side.

Furthermore, a cover glass CG is located between the second meniscus lens L2 and an image plane IP to function as a filter such as an infrared ray filter and an optical filter.

The image plane IP serves as an image sensor such as CCD and CMOS, and the optical system of the invention is applicable to a subminiature image sensor of ⅙ inches but not limited thereto.

The subminiature imaging optical system of the invention can be miniaturized by increasing a power of the first meniscus lens L1 and decreasing a power of the second meniscus lens L2. Especially, the subminiature imaging optical system realizes superior optical properties such as high definition through the first and second meniscus lenses L1 and L2 each having aspherical surfaces at both of the object and image sides.

That is, the first meniscus lens L1 has a relatively greater positive refractive power and the second meniscus lens L2 has a relatively smaller positive refractive power so as to correct various aberrations, thereby attaining high definition. Notably, the invention employs the aspherical lenses, thereby enhancing definition of the lenses and diminishing distortion and spherical aberration. This produces a compact optical system having superior optical properties.

Furthermore, an air gap between the first and second meniscus lenses L1 and L2 can be lowered to prevent distortion and decline in a peripheral brightness ratio.

In addition, the first and second meniscus lenses L1 and L2 may be made of plastics, thereby easily manufacturing the aspherical lenses at a low cost.

Meanwhile, the first and second meniscus lens L1 and L2 each have a positive refractive power and include aspherical surfaces. This reduces an angle of incidence of light entering the periphery or margin of the lens, thereby ensuring light to propagate uniformly to a central portion or the periphery of the image sensor and also to propagate around the periphery of the lens. Consequently, this prevents darkening and distortion that may occur in the periphery of the lens.

With an overall construction as just described, operation and effects of following relations 1 to 4 will be explained hereunder.

$$0.1 < D/TL < 0.2 \qquad \text{relation 1,}$$

where D is the gap between the first and second lenses and TL is a distance from the aperture stop to an image plane.

Relation 1 concerns the gap between the first and second lenses L1 and L2. If D becomes big beyond an upper limit of the relation 1, an air gap between the first and second lenses L1 and L2 should be increased to lead to distortion and decline in a peripheral brightness ratio, thereby hampering mass-productiblity. In contrast, if D becomes small below a lower limit of the relation 1, the gap between the first and second lenses L1 and L2 should be narrowed to cause flares and pose difficulty in manufacturing thereof.

$$1.0 < R2o/R2i < 10 \qquad \text{relation 2,}$$

where R2o is a curvature radius of the second lens at the object side, and R2i is a curvature radius of the second lens at the image side.

Relation 2 represents a configuration of the second meniscus lens L2. If R2o/R2i is beyond the upper and lower limits of the relation 2, aspherical aberration and distortion is excessively generated.

$$0 < f1/f2 < 0.25 \qquad \text{relation 3,}$$

where f1 is a focal distance of the first lens, f2 is a focal distance of the second lens.

Relation 3 pertains to power arrangement of the optical system. If f1 becomes big beyond the upper limit of relation 3, the power of the second lens L2 gets excessively big, so that degrade tolerance properties. That is, if f1 surpasses the upper limit, the power of the first lens L1 is reduced to undermine miniaturization thereof and render various aberrations hardly correctable.

In contrast, if f1 becomes small beyond the lower limit of relation 3, the power of the first lens L1 is expanded to increase spherical aberrations and comatic aberrations and enlarge an angle of the periphery of the second lens L2 at the image side, thereby posing difficulty in manufacturing thereof.

$$0.25 < R1o/efl < 0.5 \qquad \text{relation 4,}$$

where R1o is a curvature radius of the first lens at the object side, and efl is an effective focal distance of an entire optical system.

Relation 4 governs a configuration of the first meniscus lens L1. If R1o exceeds the upper limit, the power of the first lens L1 is lowered to adversely affect miniaturization thereof. In contrast, if R1o falls short of the lower limit, the lens is hardly processable and manufactured at a higher cost. In addition, if R1o is beyond the upper and lower limits, spherical aberration and astigmatic aberration are worsened.

The invention will be explained hereunder through detailed examples of aberration.

Examples 1 to 3, as described above, each include an aperture stop AS, a first meniscus lens L1 and a second meniscus lens L2 sequentially positioned from an object side to an image side. The first meniscus lens L1 has a positive refractive power, and includes aspherical surfaces at both of object and image sides. Here, the object side of the first meniscus lens L1 is convex. The second meniscus lens L2 has a positive refractive power, and includes aspherical surfaces at both of the object and image sides. Here, the image side of the second meniscus lens L2 is convex.

Meanwhile, a cover glass CG is disposed between the second lens L2 and an image plane IP to function as a filter such as an infrared ray filter and an optical filter.

In the Examples below, the first and second lenses L1 and L2 were made of a plastic such as ZEONEX-based E48R.

However, the first lens L1 of Example 3 was made of APEL05. Yet, these materials for the lens can be substituted by other materials which may satisfy the relations 1 to 4.

Further, the Examples below relate to an optical system applicable to an image sensor of ⅙ inches, which is adequately modifiable in accordance with a pixel size, the number of pixels or the type of an imaging device without departing from the scope of the invention.

Meanwhile, the aspherical surfaces adopted in the examples are obtained from the known relation 1. "E and a number following the E" used in a conic constant K and aspherical coefficients A to E represent a 10's power. For example, E+01 represents $10^1$ and E-02 represents $10^{-2}$.

$$Z = \frac{cY^2}{1 + \sqrt{1-(1+k)c^2Y^2}} + AY^4 + BY^6 + CY^8 + DY^{10} + EY^{12} + FY^{14} + K, \quad \text{equation 1}$$

where Z is a distance from a vertex of the lens to an optical axis, Y is a distance toward a direction perpendicular to the optical axis, c is a reciprocal number of a curvature radius r at the vertex of the lens, K is a conic constant, and A, B, C, D, E and F are aspherical coefficients.

EXAMPLE 1

Table 1 below shows aberrations of a subminiature optical system according to Example 1 of the invention.

FIG. 1 is a diagram illustrating lens arrangement of the subminiature optical system using aspherical lenses according to Example 1 of the invention. FIGS. 2a to 2c are aberrational diagrams illustrating the optical system shown in Table 1 and FIG. 1. FIG. 3 is a graph illustrating MTF properties according to Example 1.

Moreover, in the following astigmatic aberration diagram, "S" denotes sagital and "T" denotes tangential.

Here, Modulation Transfer Function (MTF) is determined by a spatial frequency of a cycle per millimeter and defined by following equation 2 between maximum light intensity Max and minimum light intensity Min.

$$MTF = \frac{Max - Min}{Max + Min}, \quad \text{equation 2}$$

That is, MTF is most ideal when 1 and decrease in MTF value leads to decline in definition.

In Example 1, an F number FNo is 2.815, an angle of view is 60.89, a distance TL between the aperture stop to the image plane is 3.35 mm, an effective focal distance efl is 2.7209 mm, a focal distance f1 of the first lens is 2.9327 mm, and a focal distance f2 of the second lens is 12.1203 mm.

TABLE 1

| Plane No. | Radius of Curvature R (mm) | Plane Interval t (mm) | Refractive Index $n_d$ | Abbe Number $v_d$ | Remarks |
|---|---|---|---|---|---|
| 1 | ∞ | 0.10 | | | Aperture stop |
| *2 | 0.8410 | 0.60 | 1.53 | 55 | First lens |
| *3 | 1.3770 | 0.50 | | | |
| *4 | -16.0570 | 0.85 | 1.53 | 55 | Second lens |
| *5 | -4.6770 | 0.20 | | | |
| 6 | ∞ | 0.55 | 1.53 | 64 | Cover glass |
| 7 | ∞ | 0.55 | | | |
| 8 | ∞ | — | | | Image plane |

In Table 1, * denotes an aspherical surface, and in Example 1, all refractive surfaces of the lenses are aspherical.

Table 2 indicates ashperical coefficients of Example 1 according to equation 1.

TABLE 2

| Plane No. | K | A | B | C | D | E |
|---|---|---|---|---|---|---|
| 2 | -5.99239E-01 | 8.90412E-02 | 1.02181E+00 | -4.19262E+00 | 1.13858E+01 | -1.09423E+01 |
| 3 | 4.93034E+00 | 1.40283E-01 | -4.60392E-01 | 2.68812E+00 | -2.45165E+00 | -3.30171E+00 |
| 4 | 7.00000E+00 | -3.52832E-02 | -2.23067E+00 | 9.94470E+00 | -2.25762E+01 | 1.84573E+01 |
| 5 | -4.27600E+00 | -8.47271E-04 | -2.65763E-01 | 3.15771E-01 | -2.16271E-01 | 4.28573E-02 |

EXAMPLE 2

Table 3 below shows aberrations of a subminiature optical system according to Example 2 of the invention.

Figure 4:
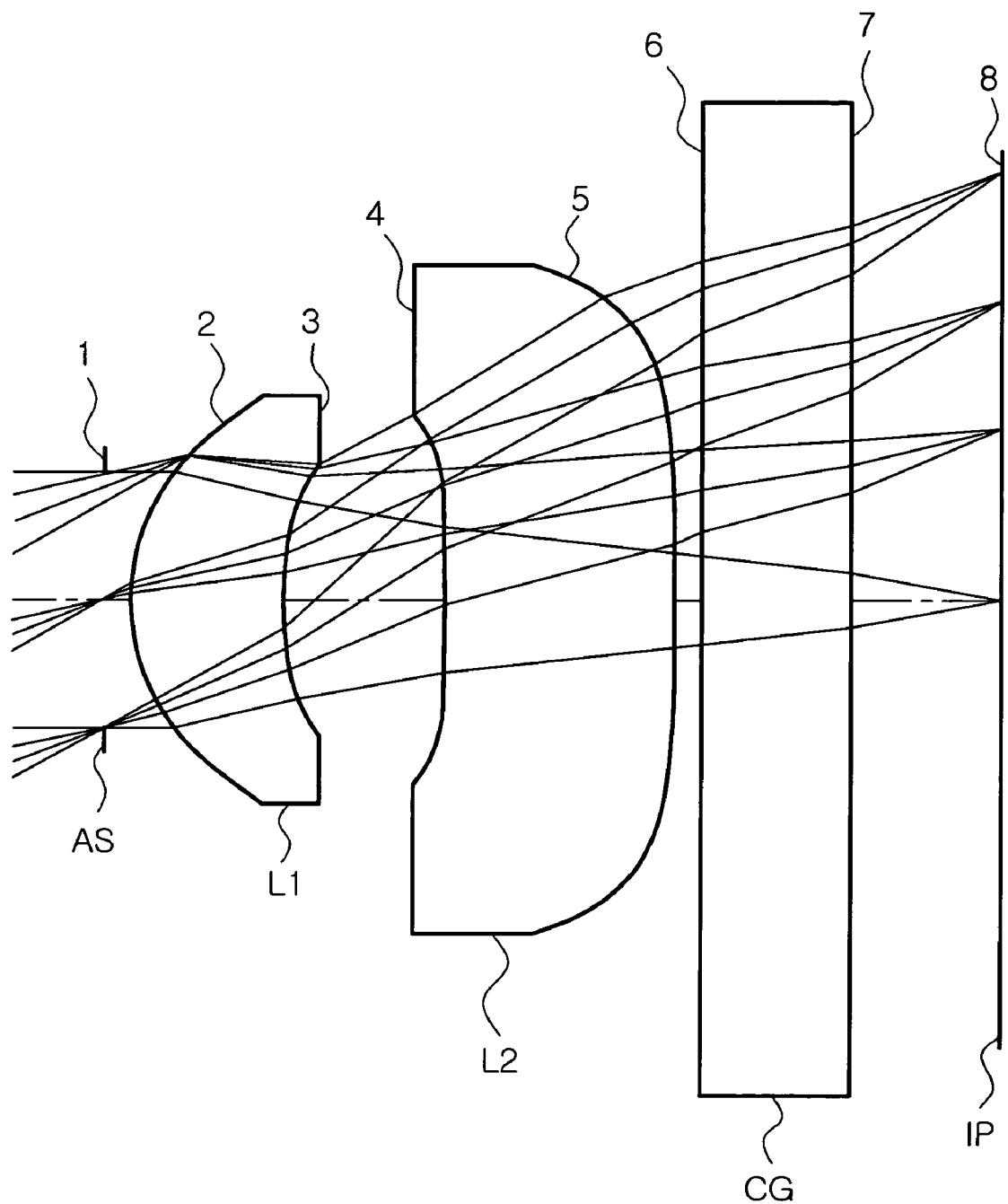
FIG. 4 is a lens configuration diagram illustrating a subminiature optical system according to a second embodiment of the invention.

FIG. 4 is a diagram illustrating lens arrangement of the subminiature optical system using aspherical lenses according to Example 2 of the invention. FIGS. 5a to 5c are aberrational diagrams illustrating the optical system shown in Table 3 and FIG. 4. FIG. 6 is a graph illustrating MTF properties of Example 2.

In Example 2, an F number FNo is 2.9, an angle of view is 60 degree, a distance TL between an aperture stop and an image plane is 3.29 mm, an effective focal distance efl of the optical system is 2.7739 mm, a focal distance f1 of the first lens is 2.8057 mm, and a focal lens f2 of the second lens is 80.5390 mm.

TABLE 3

| Plane No. | Radius of Curvature R (mm) | Plane Interval t (mm) | Refractive Index $n_d$ | Abbe Number $v_d$ | Remarks |
|---|---|---|---|---|---|
| 1 | ∞ | 0.10 | | | Aperture stop |
| *2 | 0.8391 | 0.56 | 1.53 | 55 | First lens |
| *3 | 1.4774 | 0.58 | | | |
| *4 | -241.1414 | 0.85 | 1.53 | 55 | Second lens |
| *5 | -36.3527 | 0.10 | | | |
| 6 | ∞ | 0.55 | 1.53 | 64 | Cover glass |
| 7 | ∞ | 0.55 | | | |
| 8 | ∞ | — | | | Image plane |

In Table 3, * denotes an aspherical surface, and all refractive surfaces of the lenses of Example 2 are aspherical.

Table 4 demonstrates aspherical coefficients of Example 2 according to equation 1.

Figure 2:
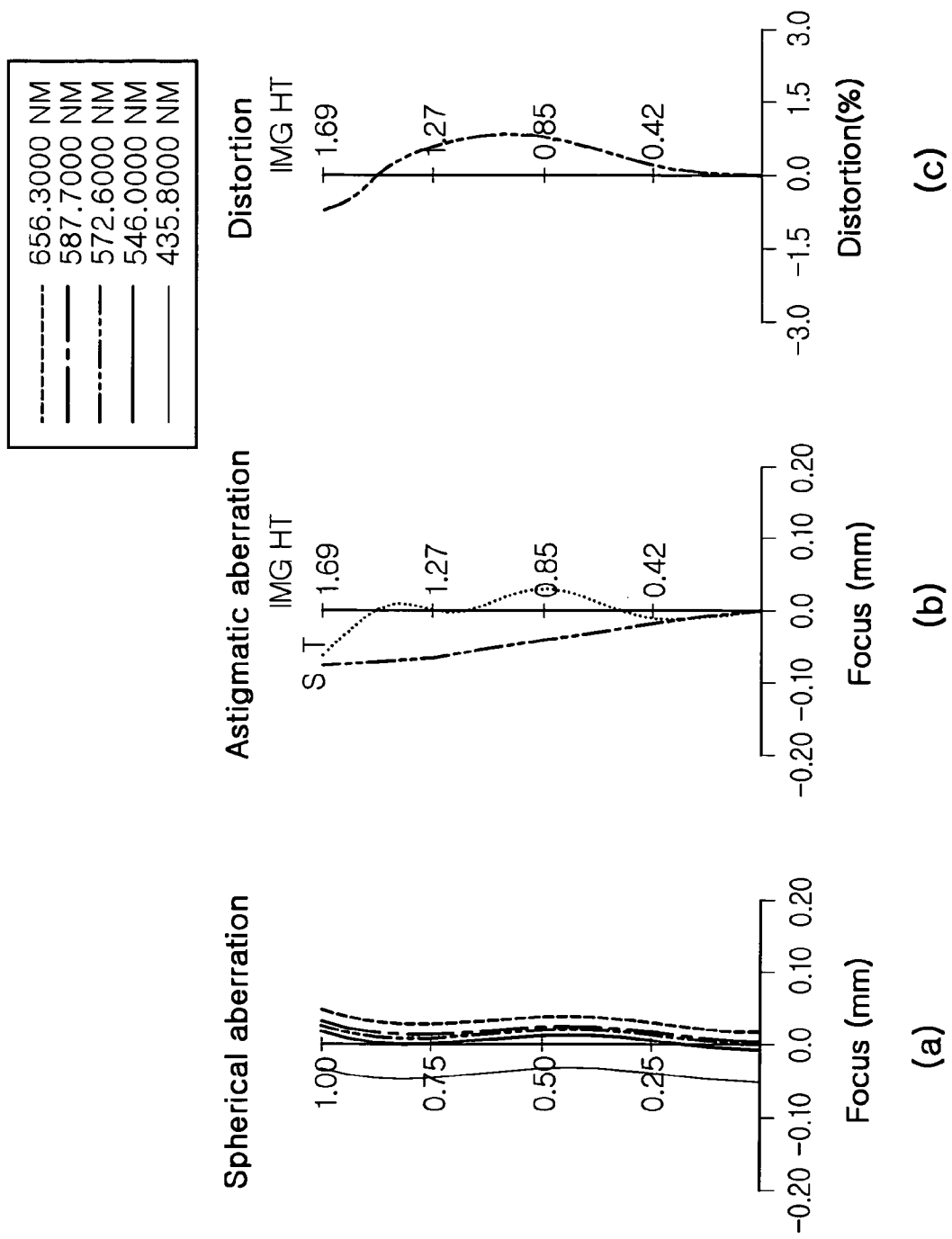
FIG. 2 is an aberrational diagram of the first embodiment shown in FIG. 1, in which (a) denotes spherical aberration, (b) astigmatic aberration and (c) distortion.
Figure 3:
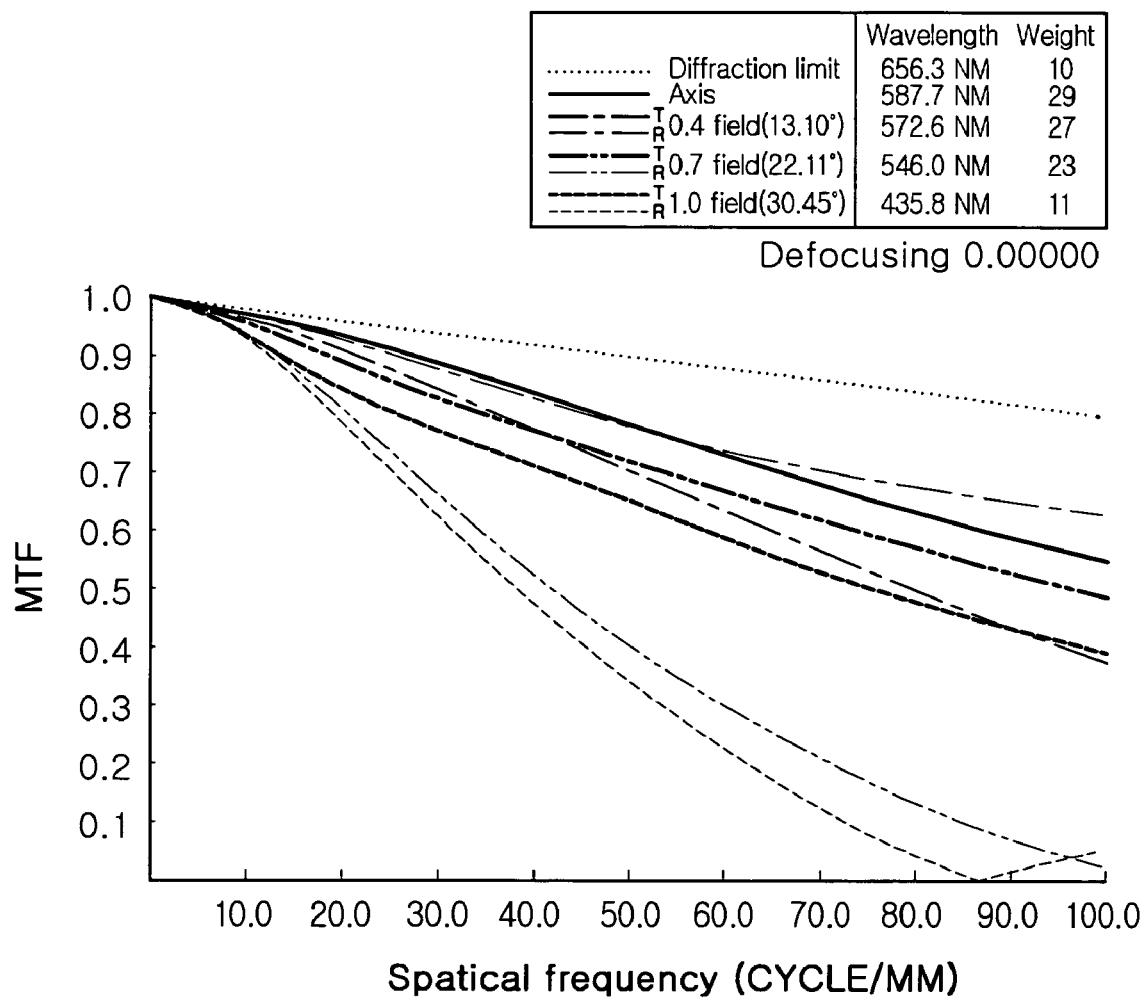
FIG. 3 is a graph illustrating MTF properties of the first embodiment shown in FIG. 1.
Figure 5:
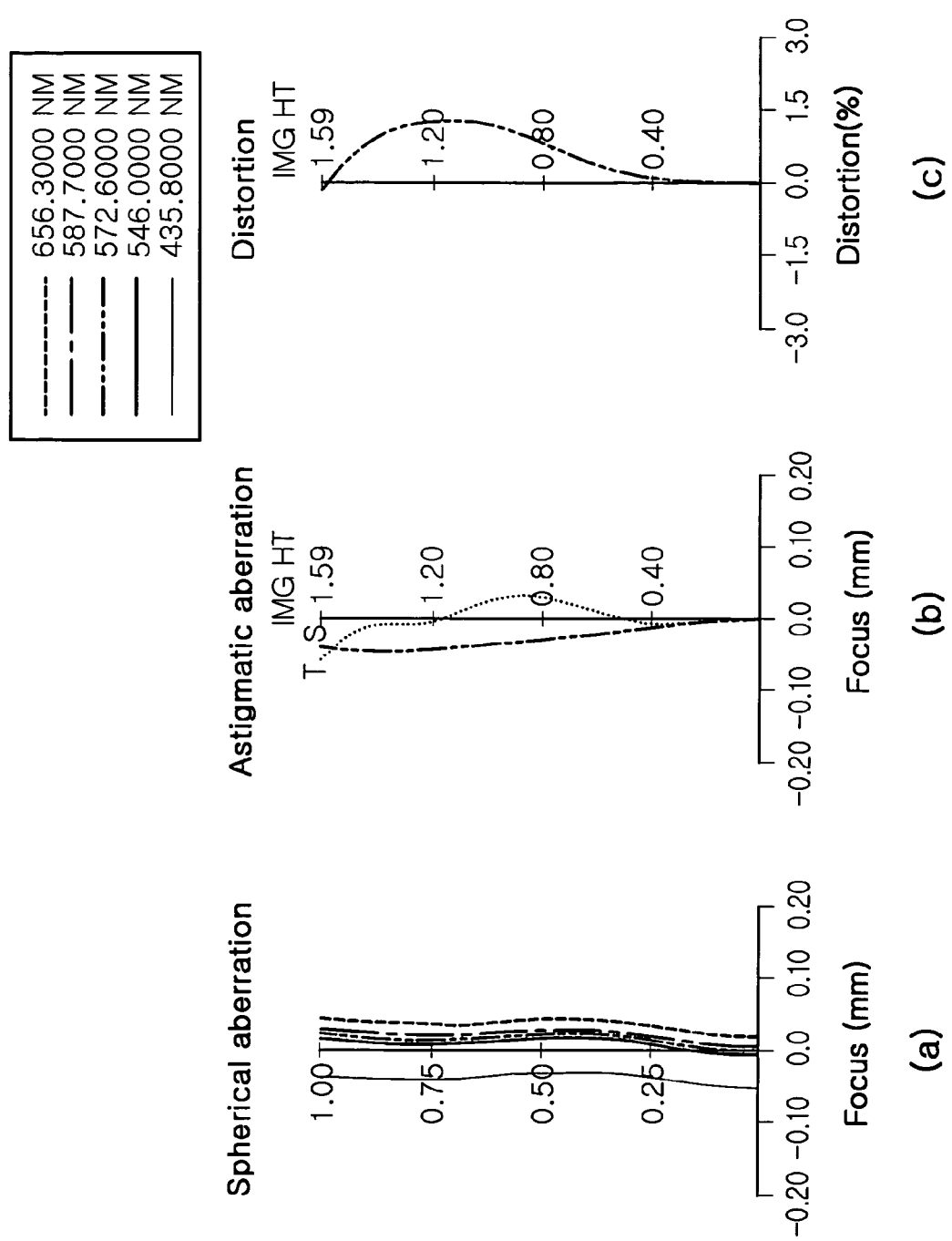
FIG. 5 is an aberrational diagram of the second embodiment shown in FIG. 4, in which (a) denotes spherical aberration, (b) astigmatic aberration and (c) distortion.
Figure 6:
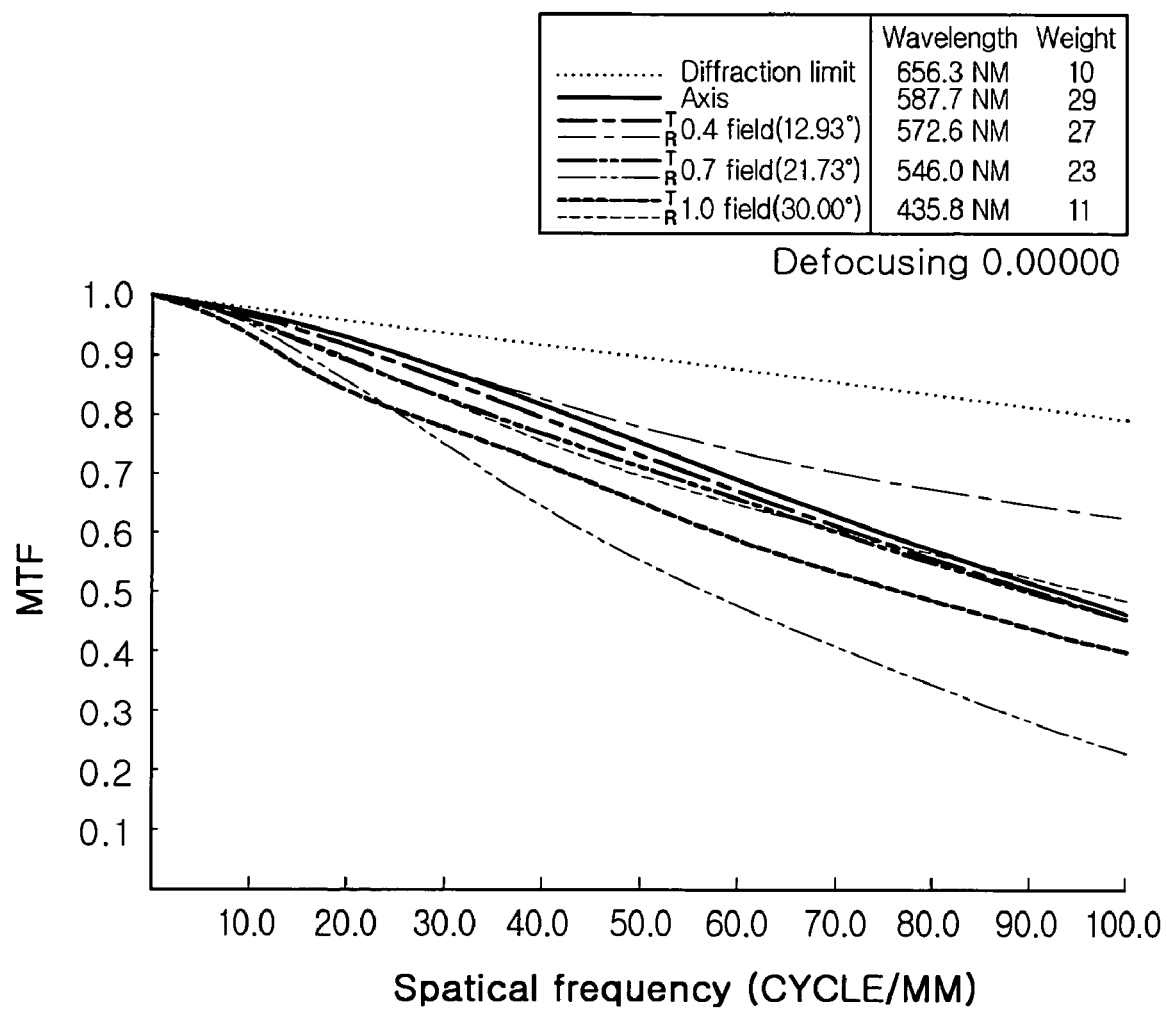
FIG. 6 is a graph illustrating MTF characteristics of the second embodiment shown in FIG. 4.
Figure 8:
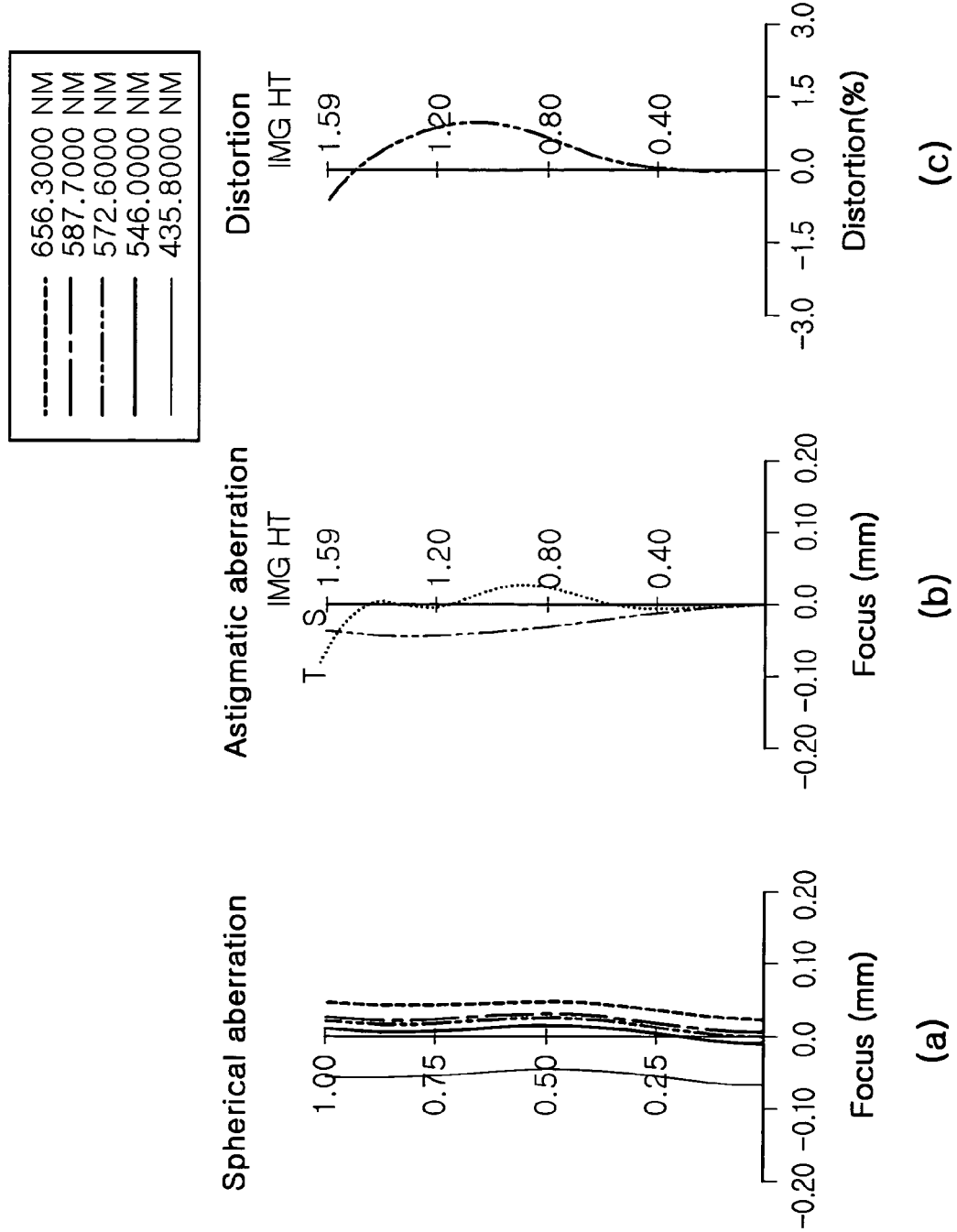
FIG. 8 is an aberrational diagram of the third embodiment shown in FIG. 7, in which (a) denotes spherical aberration, (b) astigmatic aberration, and (c) distortion.
Figure 9:
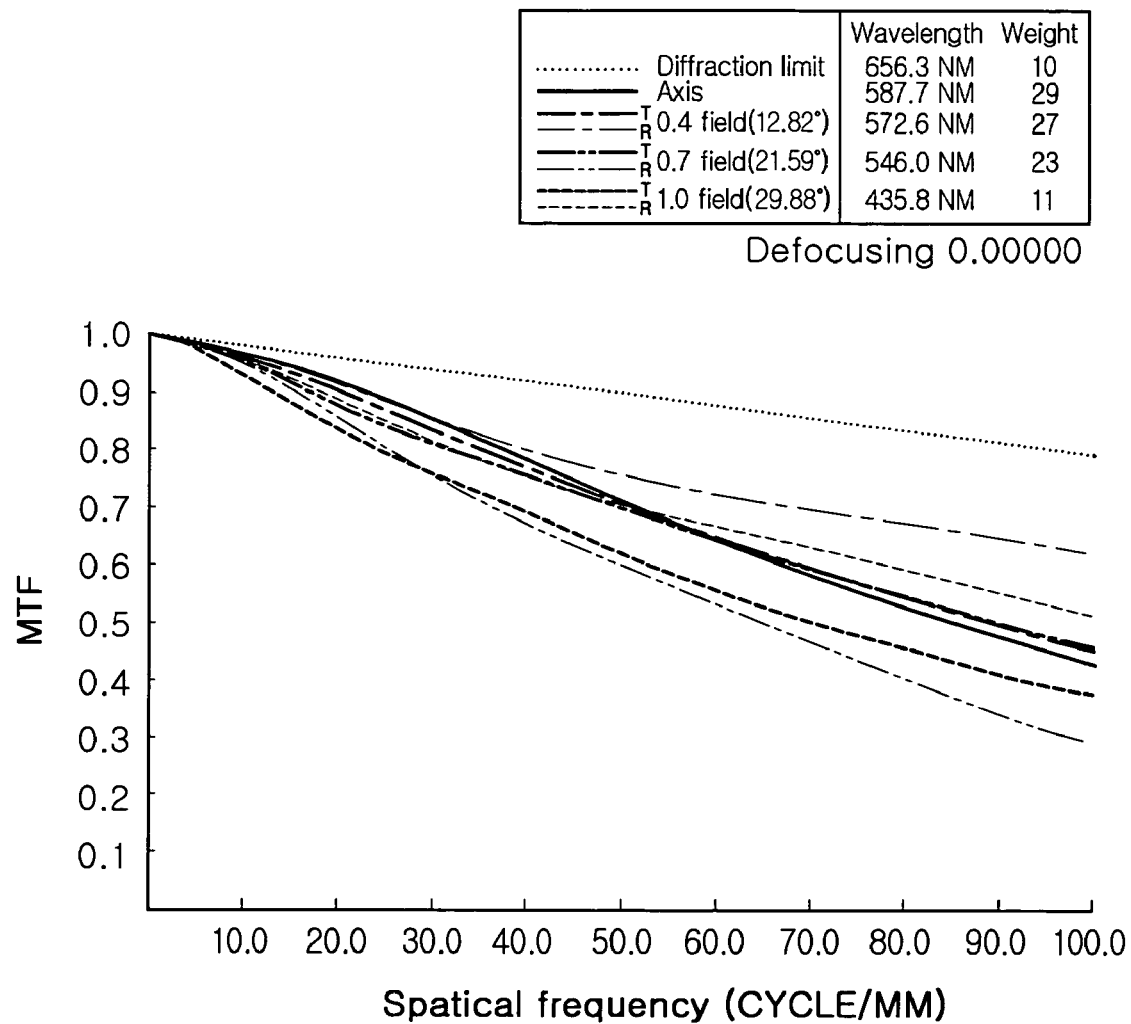
FIG. 9 is a graph illustrating MIF properties of the third embodiment shown in FIG. 7.

These Examples produce an optical system superior in aberration properties, as shown in FIGS. 2, 5 and 8, and a subminiature optical system with excellent MTF properties and high definition as shown in FIGS. 3, 6 and 9.

TABLE 4

| Plane No. | K | A | B | C | D | E | F |
|---|---|---|---|---|---|---|---|
| 2 | −5.82858E−01 | 9.12794E−02 | 1.03911E+00 | −4.66624E+00 | 1.37903E+01 | −1.35716E+01 | |
| 3 | 5.19160E+00 | 1.58540E−01 | −1.11540E+00 | 1.18451E+01 | −4.77586E+01 | 8.57870E+01 | |
| 4 | −3.00000E+00 | −1.73832E−01 | −1.14287E+00 | 4.24065E+00 | −9.35945E+00 | 8.29940E+00 | −4.39841E+00 |
| 5 | −5.00000E+00 | −6.85640E−02 | −5.84932E−02 | −5.42630E−04 | 2.35414E−02 | −2.15110E−02 | |

EXAMPLE 3

Table 5 below indicates aberration of a subminiature optical system according to Example 3 of the invention.

Figure 7:
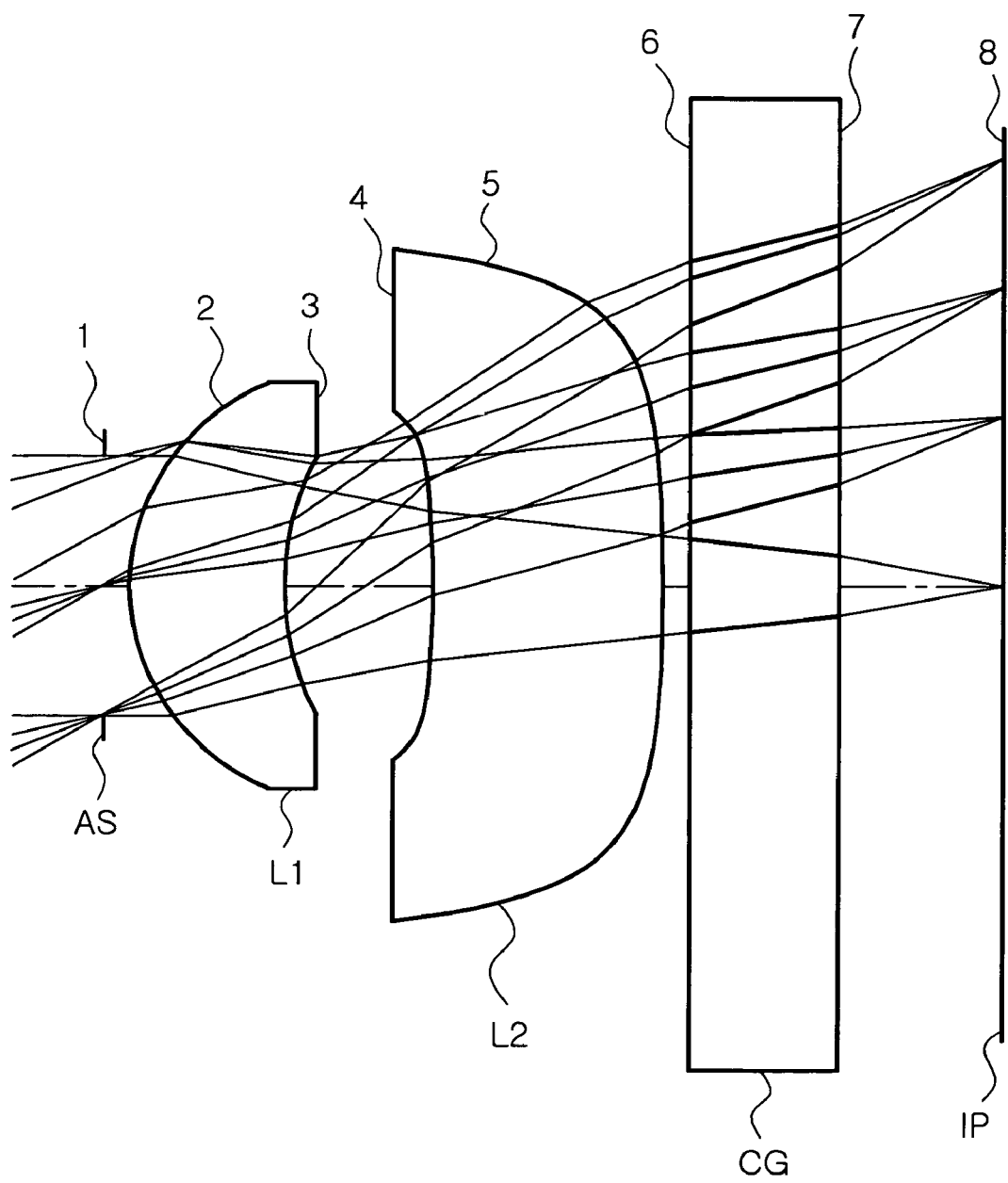
FIG. 7 is a lens configuration diagram illustrating a subminiature optical system according to a third embodiment of the invention.

Also, FIG. 7 is a diagram illustrating lens arrangement of the subminiature optical system using aspherical lenses according to Example 3 of the invention. FIGS. 8a to 8c are aberrational diagrams illustrating the optical system shown in Table 5 and FIG. 7. FIG. 9 is a graph illustrating MFT properties according to Example 3.

In Example 3, an F number FNo is 2.889, an angle of view is 60, a distance TL between the aperture stop and an image plane is 3.31 mm, an effective focal distance of the optical system efl is 2.8021 mm, a focal distance f1 of the first lens is 2.7540 mm, and a focal distance f2 of the second lens is 91.8332 mm.

TABLE 5

| Plane No. | Radius of Curvature R (mm) | Plane Interval t (mm) | Refractive Index $n_d$ | Abbe number | Remarks |
|---|---|---|---|---|---|
| 1 | ∞ | 0.10 | | | Aperture stop |
| *2 | 0.8402 | 0.57 | 1.54 | 40 | First lens |
| *3 | 1.4571 | 0.54 | | | |
| *4 | −10.1420 | 0.85 | 1.53 | 55 | Second lens |
| *5 | −8.6390 | 0.10 | | | |
| 6 | ∞ | 0.55 | 1.53 | 64 | Cover glass |
| 7 | ∞ | 0.60 | | | |
| 8 | ∞ | — | | | Image plane |

In Table 5, * denotes an aspherical surface and all refractive surfaces of the lenses of Example 3 are aspherical.

Table 6 demonstrates aspherical coefficients of Example 3 according to equation 1.

Meanwhile, Table 7 notes values of the equations 1 to 4 with respect to Examples 1 to 3.

TABLE 7

| | Equation 1 | Equation 2 | Equation 3 | Equation 4 |
|---|---|---|---|---|
| Example 1 | 0.149 | 3.433 | 0.2420 | 0.309 |
| Example 2 | 0.176 | 6.633 | 0.0348 | 0.302 |
| Example 3 | 0.162 | 1.174 | 0.0300 | 0.300 |

As shown in Table 7, Examples 1 to 3 of the invention are found to fulfill the relations 1 to 4.

As set forth above, according to preferred embodiments of the invention, only two meniscus lenses each having a positive power including aspherical surfaces at both of object and image sides are adopted to obtain a high-definition subminiature imaging optical system which is reduced in size and length due to fewer constituent lenses.

Moreover, the invention produces a subminiature imaging optical system which is improved in various aberration properties such as distortion, spherical aberration and astigmatic aberration and can sufficiently assure a peripheral brightness ratio.

In addition, at least two lenses made of plastics are employed to mass-produce the lighter-weight optical system easily at a lower cost.

While the present invention has been shown and described in connection with the preferred embodiments, it will be apparent to those skilled in the art that modifications and variations can be made without departing from the spirit and scope of the invention as defined by the appended claims.

TABLE 6

| Plane No. | K | A | B | C | D | E | F |
|---|---|---|---|---|---|---|---|
| 2 | −6.30044E−01 | 1.07049E−01 | 8.52093E−01 | −3.45951E+00 | 9.87028E+00 | −8.69892E+00 | −6.30044E−01 |
| 3 | 5.85058E+00 | 6.07898E−02 | −4.72203E−01 | 3.10658E+00 | −7.50277E+00 | 4.18810E+00 | 5.85058E+00 |
| 4 | 0.00000E+00 | −3.85003E−01 | 1.02825E+00 | −9.27633E+00 | 2.79460E+01 | −3.59398E+01 | 0.00000E+00 |
| 5 | −1.00000E+00 | −1.26605E−01 | 1.67735E+00 | −4.65481E−01 | 4.37399E−01 | −1.67918E−01 | −1.00000E+00 |

What is claimed is:

1. A subminiature imaging optical system comprising:
an aperture stop;
a first meniscus lens having a positive refractive power, and including aspherical surfaces at both of object and image sides, the object side being convex; and
a second meniscus lens having a positive refractive power, and including aspherical surfaces at both of the object and image sides, the image side being convex,
wherein the first lens has a gap from the second lens according to following relation 1:

$$0.1 < D/TL < 0.2 \qquad \text{relation 1,}$$

where D is the gap between the first and second lenses and TL is a distance from the aperture stop to an image plane.

2. The subminiature imaging optical system according to claim 1 wherein the second lens has a configuration according to following relation 2:

$$1.0 < R2o/R2i < 10 \qquad \text{relation 2,}$$

where $R2o$ is a curvature radius of the second lens at the object side, and $R2i$ is a curvature radius of the second lens at the image side.

3. The subminiature imaging optical system according to claim 1, wherein the first and second lenses have a refractive power according to following relation 3:

$$0 < f1/f2 < 0.25 \qquad \text{relation 3,}$$

wherein f1 is a focal distance of the first lens and f2 is a focal distance of the second lens.

4. The subminiature imaging optical system according to claim 3, wherein the first lens has a configuration according to following relation 4:

$$0.25 < R1o/efl < 0.5 \qquad \text{relation 4,}$$

wherein $R1o$ is a curvature radius of the first lens at the object side, and efl is an effective focal distance of an entire optical system.

5. A subminiature imaging optical system, comprising:
an aperture stop;
a first meniscus lens having a positive refractive power, and including aspherical surfaces at both of object and image sides, the object side being convex; and
a second meniscus lens having a positive refractive power, and including aspherical surfaces at both of the object and image sides, the image side being convex, wherein the second lens has a configuration according to following relation 2:

$$1.0 < R2o/R2i < 10 \qquad \text{relation 2,}$$

where $R2o$ is a curvature radius of the second lens at the object side, and $R2i$ is a curvature radius of the second lens at the image side.

6. A subminiature imaging optical system, comprising:
an aperture stop;
a first meniscus lens having a positive refractive power, and including aspherical surfaces at both of object and image sides, the object side being convex; and
a second meniscus lens having a positive refractive power, and including aspherical surfaces at both of the object and image sides, the image side being convex, wherein the first and second lenses have a refractive power according to following relation 3:

$$0 < f1/f2 < 0.25 \qquad \text{relation 3,}$$

wherein f1 is a focal distance of the first lens and f2 is a focal distance of the second lens.

7. The subminiature imaging optical system according to claim 6, wherein the first lens has a configuration according to following relation 4:

$$0.25 < R1o/efl < 0.5 \qquad \text{relation 4,}$$

wherein $R1o$ is a curvature radius of the first lens at the object side, and efl is an effective focal distance of an entire optical system.

* * * * *

UNITED STATES PATENT AND TRADEMARK OFFICE
CERTIFICATE OF CORRECTION

PATENT NO. : 7,372,639 B2 Page 1 of 1
APPLICATION NO. : 11/603014
DATED : May 13, 2008
INVENTOR(S) : Tae Young Kim It is certified that error appears in the above-identified patent and that said Letters Patent is hereby corrected as shown below:

Column 9, Line 2, after "system" insert --,--.

Column 9, Line 18 (approx.), after "1" insert --,--.

Signed and Sealed this

Twenty-first Day of October, 2008

JON W. DUDAS
*Director of the United States Patent and Trademark Office*